2,750,325
         INJECTABLE ERYTHROMYCIN PREPARATIONS

Harold L. Market and Hubert W. Murphy, Indianapolis,
  Ind., assignors to Eli Lilly and Company, Indianapolis,
  Ind., a corporation of Indiana No Drawing. Application September 3, 1954,
                    Serial No. 454,228

6 Claims. (Cl. 167—65)

Our invention relates to a novel therapeutic composition. More particularly, it relates to an injectable solution of the antibiotic erythromycin. Our new injectable solution is specially adapted for intramuscular administration.

Erythromycin, which is disclosed in United States Patent No. 2,653,246, is an antibiotic with an antibacterial spectrum similar to penicillin as regards gram-positive organisms, plus a moderately effective action against certain large viruses, against *Endamoeba histolytica* and against the Rickettsiae. With such a wide variety of antibacterial actions, it has been classed as a broad spectrum antibiotic. It is particularly useful in penicillin-resistant staphylococcal infections. Although erythromycin is effective orally, it is very desirable to have such a useful antibiotic in injectable form for administration to moribund patients, or those with severe epigastric disturbances accompanied by frequent vomiting. Moreover, very young children cannot readily swallow pills, capsules, or suspensions, and accordingly an effective, painless, and nonirritating injectable form of erythromycin is highly desirable for the treatment of such patients.

By this invention we have provided a novel therapeutic composition comprising a therapeutically effective amount of erythromycin dissolved in a lower dialkyl carbonate. In the provision of our novel pharmaceutical composition, we employ a lower dialkyl carbonate in which the alkyl groups have from 1 to 3 carbon atoms, such including dimethyl carbonate, dipropyl carbonate, ethyl isopropyl carbonate, and the like.

The concentration of erythromycin employed in the composition can be varied over a wide range. Preferably, however, erythromycin is dissolved in a relatively small volume of the dialkyl carbonate, so that the injection volume is minimal. Thus, in preparing our novel injectable compositions, erythromycin is dissolved in a lower dialkyl carbonate in the amount of from about 25 mgs./ml. upwards to the limit of solubility of the erythromycin in the vehicle, which is about 100 mgs./ml. For ease in calculation of dosage and to minimize the possibility of having erythromycin precipitate if chilled during shipment, it is preferred to employ concentrations of about 50 mgs. of erythromycin per milliliter of dialykl carbonate.

An illustrative injectable composition consisting of erythromycin and a lower dialkyl carbonate, prepared in accordance with our invention, is as follows:

Erythromycin _____ mg__ 40
Diethyl carbonate q. s. to 1 ml.

The above composition is prepared by dissolving 4 g. of pure erythromycin or an amount of substantially pure erythromycin which is equivalent in activity to 4 g. of pure material, in sufficient diethyl carbonate to make 100 ml. of solution. The solution is then sterilized by filtering it through a Selas filter, and is ampouled under aseptic conditions.

A composition prepared in accordance with the foregoing is indefinitely stable at room temperature. Even exposure of the material to accelerated aging conditions of 50° C. for a period of four months resulted in no detectable loss in potency.

When used clinically by intramuscular administration, erythromycin in a lower dialkyl carbonate is fully as effective as other erythromycin preparations and hence is employed in the usual dosage schedules. The solution has the advantages of a more rapid onset of action by reason of its mode of administration, and has a duration of action equal to or even more prolonged than other therapeutic forms of erythromycin now in use.

The lower dialkyl carbonates which we employ in our novel pharmaceutical preparation are relatively nontoxic, as evidenced by the large amounts of material necessary to kill an experimental animal. For example, diethyl carbonate, a readily available representative of this group of substances, has an acute subcutaneous toxicity in mice of about 9.6 ml./kg. and in rats of about 12.5 ml./kg. The above amounts if translated to a human of 150 pounds weight are equivalent to almost 2 quarts of diethyl carbonate.

A solution such as the foregoing can be maintained sterile without other additives since diethyl carbonate is itself slightly bacteriostatic to typical contaminating organisms, including yeasts, molds, and spore-forming bacteria. However, to minimize the possibility of contamination with some resistant organism, it is desirable to incorporate in the composition as a precautionary measure one of the known preservatives such as chlorobutanol, phenol, benzyl alcohol, and the like.

As is illustrated by the following composition, a preservative is added in the amount of about 0.5°/° in accordance with common practice.

Erythromycin _____ mg__ 50
Chlorobutanol _____ mg__ 5
Dipropyl carbonate q. s. to make 1 ml.

Additionally, although a solution of erythromycin in a lower dialkyl carbonate evokes substantially no pain on injection, any residuum of pain caused by the injection is readily controlled by incorporating in the composition, in the amount of 1 or 2 per cent, a suitable local anesthetic. Suitable local anesthetics include: procaine, benzocaine, and 1-benzamido-1-phenyl-3-piperidinopropane, the last being disclosed in a co-pending application, Serial No. 397,261, filed December 9, 1953, by Albert Pohland.

Since the common salts of the local anesthetics prepared from inorganic acids are not appreciably soluble in dialkyl carbonates, it is necessary to employ the anesthetic in the form of its free base, or in the form of a soluble salt, in order to provide a suitable anesthetic concentration.

An embodiment of our invention utilizing a local anesthetic is as follows:

Pure erythromycin_____ g__ 2.75
1-benzamido-1-phenyl-3-piperidinopropane _____ g__ 1.00
Dimethyl carbonate q. s. to make 50 ml.

A preferred embodiment of our invention in which are incorporated both a preservative and a local anesthetic is as follows:

Pure erythromycin_____ mg__ 50
1-benzamido-1-phenyl-3-piperidinopropane _____ mg__ 20
Phenol _____ mg__ 5
Diethyl carbonate q. s. to make 1 ml.

It will be understood that in addition to or in place of erythromycin itself, this invention also comprehends within its scope the use of derivatives of erythromycin which are therapeutically effective and are soluble in a lower dialkyl carbonate as, for example, esters of erythromycin such as erythromycin ethyl carbonate, erythromycin propionate, and the like. This invention also includes within its scope other antibiotic and/or chemotherapeutic agents which act additively or synergistically with erythromycin, or aid in its administration, as well as pharmaceutical adjuvants.

We claim:

1. A therapeutic composition comprising a solution of erythromycin in a lower dialkyl carbonate, in which the alkyl groups have from 1 to 3 carbon atoms.

2. A therapeutic composition comprising a solution of erythromycin in diethyl carbonate.

3. A therapeutic composition comprising a solution of erythromycin in dimethyl carbonate.

4. A therapeutic composition comprising a solution containing from about 25 to about 100 milligrams per milliliter of erythromycin in a lower dialkyl carbonate, in which the alkyl groups have from 1 to 3 carbon atoms.

5. A therapeutic composition comprising a solution containing about 50 milligrams per milliliter of erythromycin in diethyl carbonate.

6. A therapeutic composition comprising a solution containing about 50 milligrams per milliliter of erythromycin in dimethyl carbonate.

References Cited in the file of this patent

UNITED STATES PATENTS

| | | |
|---|---|---|
| 1,599,809 | Cohen | Sept. 14, 1926 |
| 2,633,445 | Marsh | Mar. 31, 1953 |
| 2,653,899 | Bunch | Sept. 29, 1953 |

OTHER REFERENCES

Gregory: "Uses and Applications of Chemicals." Reinhold, New York, 1939, pp. 236 and 237.

Karrer: "Organic Chemistry." Elsevier, Second English Ed., 1946, p. 172.

Murphy: "Esters of Erythromycin." Antibiotics Annual, 1953–1954, December 1953, pp. 500 to 513; see also p. 514.